US011147140B2

(12) United States Patent
Ukegawa

(10) Patent No.: US 11,147,140 B2
(45) Date of Patent: Oct. 12, 2021

(54) BACKLIGHT SYSTEM, DISPLAY APPARATUS, AND CONTROL METHOD FOR BACKLIGHT SYSTEM

(71) Applicant: NEC Display Solutions, Ltd., Tokyo (JP)

(72) Inventor: Tomohisa Ukegawa, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/765,402

(22) PCT Filed: Nov. 24, 2017

(86) PCT No.: PCT/JP2017/042275
§ 371 (c)(1),
(2) Date: May 19, 2020

(87) PCT Pub. No.: WO2019/102597
PCT Pub. Date: May 31, 2019

(65) Prior Publication Data
US 2020/0337135 A1 Oct. 22, 2020

(51) Int. Cl.
*H05B 45/44* (2020.01)
*H05B 47/185* (2020.01)
*H05B 47/10* (2020.01)

(52) U.S. Cl.
CPC ............ *H05B 45/44* (2020.01); *H05B 47/10* (2020.01); *H05B 47/185* (2020.01)

(58) Field of Classification Search
CPC .................. H05B 45/44; H05B 47/185
See application file for complete search history.

(56) References Cited

U.S. PATENT DOCUMENTS

| 9,232,586 B2* | 1/2016 | Hon ................... H05B 45/3725 |
| 9,420,652 B2* | 8/2016 | Yu .......................... H05B 45/44 |

(Continued)

FOREIGN PATENT DOCUMENTS

| JP | 2010-272410 A | 12/2010 |
| JP | 2011-049050 A | 3/2011 |

OTHER PUBLICATIONS

International Search Report (ISR) (PCT Form PCT/ISA/210), in PCT/JP2017/042275, dated Jan. 30, 2018.

*Primary Examiner* — Kurtis R Bahr
(74) *Attorney, Agent, or Firm* — McGinn I.P. Law Group, PLLC

(57) ABSTRACT

An example aspect of a backlight system of the present invention includes: a plurality of light emitting elements that operate as a light source of a backlight using bus-supplied electric power in which a voltage is changed to one of a plurality of predetermined values as a power source; a plurality of serial connection switches that connect the plurality of light emitting elements in series and disconnect connections among the plurality of light emitting elements; a plurality of parallel connection switches that connect the plurality of light emitting elements in parallel relative to the power source and disconnect the connections among the plurality of light emitting elements; and a control unit that turns on or turns off the plurality of serial connection switches and the plurality of parallel connection switches in accordance with the value of the voltage corresponding to the bus-supplied electric power.

5 Claims, 9 Drawing Sheets

(56) References Cited

U.S. PATENT DOCUMENTS

| | | | |
|---|---|---|---|
| 9,538,595 B2* | 1/2017 | Chang | H05B 45/44 |
| 9,936,549 B2* | 4/2018 | Despesse | H05B 45/397 |
| 2011/0127922 A1* | 6/2011 | Sauerlaender | H05B 45/44 |
| | | | 315/192 |
| 2012/0299490 A1* | 11/2012 | Lee | H05B 45/44 |
| | | | 315/191 |
| 2013/0241423 A1* | 9/2013 | Chu | H05B 45/44 |
| | | | 315/191 |
| 2015/0201474 A1* | 7/2015 | Lee | H05B 45/3725 |
| | | | 315/191 |

* cited by examiner

BACKLIGHT SYSTEM, DISPLAY APPARATUS, AND CONTROL METHOD FOR BACKLIGHT SYSTEM

TECHNICAL FIELD

The present invention relates to a backlight system, a display apparatus, and a control method for the backlight system.

BACKGROUND ART

In recent years, because of an increase of devices that are compatible with the Universal Serial Bus (USB) Type-C, source devices that are capable of supplying electric power up to 100 W via a VBUS line (a bus power supply line) are increasing. Moreover, USB monitors that are capable of displaying video using only a single USB Type-C cable by utilizing the above electric power are increasing.

A VBUS voltage (a bus-supplied voltage) output from a USB Type-C connector of a source device is determined using the result of power delivery authentication between the source device and a video display apparatus. However, because the VBUS voltage is determined using the performance of the source device, even if the video display apparatus requests supply of a voltage of 20 V, a voltage of any one of 5 V, 9 V, 15 V, and 20 V is output from the source device and is input to the video display apparatus. For this reason, in order to turn on a backlight of a video display apparatus that operates using USB bus power, a boost circuit is required that is capable of receiving input voltages over a wide range from 5 V to 20 V and maintaining an output voltage constant (see, for example, Patent Document 1 with respect to the backlight and the boost circuit). Such a boost circuit requires peripheral components including an integrated circuit (IC) that controls a direct current/direct current (DC/DC) converter, coils, and capacitors, and thus there is a problem in that such peripheral components lead to an increase in the costs and an increase in the area of a substrate.

PRIOR ART DOCUMENT

Patent Document

Patent Document 1: Japanese Unexamined Patent Application, First Publication No. 2011-49050

SUMMARY OF THE INVENTION

Problems to be Solved by Invention

An example object of the present invention is to provide a backlight system, a display apparatus, and a control method for the backlight system that are capable of solving the above problem.

Means for Solving the Problems

In order to solve the above example object, an example aspect of the present invention is a backlight system including: a plurality of light emitting elements that operate as a light source of a backlight using bus-supplied electric power in which a voltage is changed to one of a plurality of predetermined values as a power source; a plurality of serial connection switches that connect the plurality of light emitting elements in series and disconnect connections among the plurality of light emitting elements; a plurality of parallel connection switches that connect the plurality of light emitting elements in parallel relative to the power source and disconnect the connections among the plurality of light emitting elements; and a control unit that turns on or turns off the plurality of serial connection switches and the plurality of parallel connection switches in accordance with the value of the voltage corresponding to the bus-supplied electric power.

Moreover, an example aspect of the present invention is a display apparatus including: a backlight system that includes a plurality of light emitting elements that operate as a light source of a backlight using bus-supplied electric power in which a voltage is changed to one of a plurality of predetermined values as a power source, a plurality of serial connection switches that connect the plurality of light emitting elements in series and disconnect connections among the plurality of light emitting elements, a plurality of parallel connection switches that connect the plurality of light emitting elements in parallel relative to the power source and disconnect the connections among the plurality of light emitting elements, and a control unit that turns on or turns off the plurality of serial connection switches and the plurality of parallel connection switches in accordance with the value of the voltage corresponding to the bus-supplied electric power; and an image display unit that displays an image by transmitting the backlight.

Furthermore, an example aspect of the present invention is a control method for a backlight system, the control method including: using a plurality of light emitting elements that operate as a light source of a backlight using bus-supplied electric power in which a voltage is changed to one of a plurality of predetermined values as a power source, a plurality of serial connection switches that connect the plurality of light emitting elements in series and disconnect connections among the plurality of light emitting elements, and a plurality of parallel connection switches that connect the plurality of light emitting elements in parallel relative to the power source and disconnect the connections among the plurality of light emitting elements, turning on or turning off, by a control unit, the plurality of serial connection switches and the plurality of parallel connection switches in accordance with the value of the voltage corresponding to the bus-supplied electric power.

Example Advantages of the Invention

With the example aspects of the present invention, it is possible to apply appropriate voltages to the plurality of light emitting elements, which operate as the light source of the backlight, without using a boost circuit.

MODES FOR CARRYING OUT THE INVENTION

Figure 1:
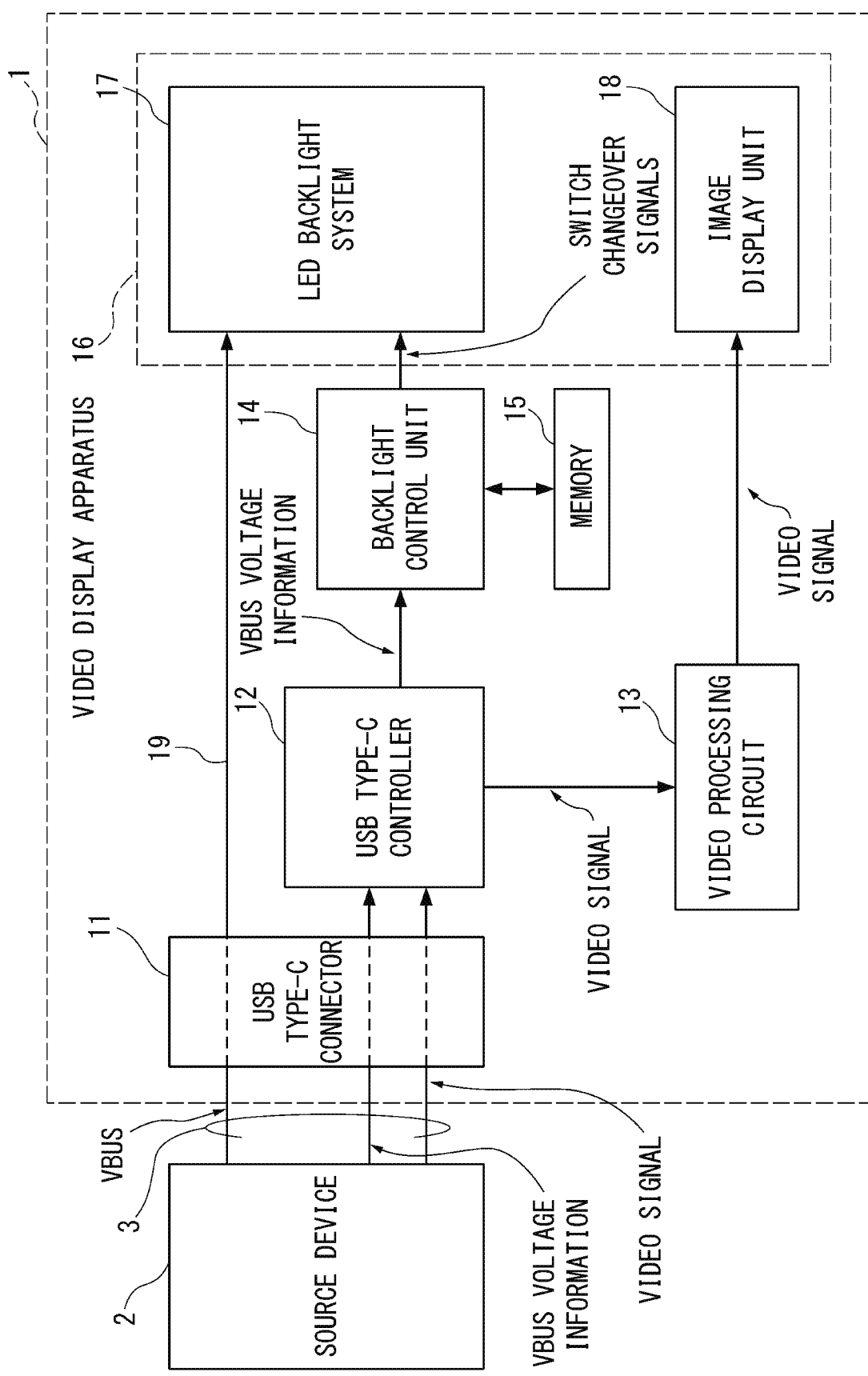
FIG. 1 is a block diagram showing an example of the structure of a video display apparatus in accordance with an example embodiment of the present invention.

Hereinafter, example embodiments of the present invention will be described with reference to the drawings. FIG. 1 is a block diagram showing an example of the structure of a video display apparatus in accordance with an example embodiment of the present invention.

A video display apparatus 1 (a display apparatus) shown in FIG. 1 is provided with a USB Type-C connector 11 (hereinafter referred to as "a USB connector 11"), a USB Type-C controller 12 (hereinafter referred to as "a USB controller 12"), a video processing circuit 13, a backlight control unit 14, a memory 15 (a storage unit), and a liquid crystal display (LCD) panel 16. Moreover, the LCD panel 16 is provided with a light emitting diode (LED) backlight system 17 and an image display unit 18. The video display apparatus 1 shown in FIG. 1 can be configured as, for example, a USB monitor. Moreover, in the present example embodiment, a light emitting diode (LED) is an example of a light emitting element.

The video display apparatus 1 receives an input of VBUS electric power (bus-supplied electric power) and a video signal from a source device 2 via a USB Type-C cable 3 (hereinafter referred to as "a USB cable 3"). The video display apparatus 1 operates using the VBUS electric power as a power source. Specifically, in the video display apparatus 1, the USB controller 12, the video processing circuit 13, the backlight control unit 14, the memory 15, and the LCD panel 16 operate using the VBUS electric power as a power source. The video display apparatus 1 of the present example embodiment uses the VBUS electric power input from the source device 2 without boosting the VBUS electric power and turns on a backlight. Moreover, the video display apparatus 1 displays the video signal input from the source device 2. As described above, in the case of the USB Type-C power delivery standard, a VBUS voltage, which is a voltage corresponding to the VBUS electric power, is dc 5 V, dc 9 V, dc 15 V, or dc 20 V.

The USB connector 11 is a connector of the USB Type-C standard. For example, the source device 2 is connected to one end of the USB cable 3, and the other end of the USB cable 3 is connected to the USB connector 11. The USB cable 3 is a cable of the USB Type-C standard. The USB cable 3 is provided with a VBUS line, a plurality of signal lines that transmit or receive VBUS voltage information, video signals, and so forth, and a ground line, which is not shown in the drawings. The VBUS voltage information includes information indicating the value of the VBUS voltage (5 V, 9 V, 15 V, or 20 V). The source device 2 is an apparatus that supplies the VBUS electric power and the video signal to the video display apparatus 1. The source device 2, is, for example, a personal computer.

The USB controller 12 controls signals that are transmitted or received via the USB connector 11. For example, once the USB controller 12 is connected to the source device 2 via the USB connector 11, the USB controller 12 performs a predetermined configuration (information exchange) with the source device 2 and receives the VBUS voltage information output by the source device 2. Moreover, the USB controller 12 outputs the received VBUS voltage information to the backlight control unit 14. Furthermore, the USB controller 12 outputs the input video signal to the video processing circuit 13.

The video processing circuit 13 performs a predetermined process such as changing of the resolution and adjustment of the image quality on the video signal input from the USB controller 12 and outputs the processed video signal to the image display unit 18.

The image display unit 18 receives the backlight emitted by the LED backlight system 17 through its back surface and displays an image by controlling the transmittance of the backlight using liquid crystal. In this case, the image display unit 18 is a transmissive liquid crystal panel. The image display unit 18 is provided with, for example, a polarizer, a pixel electrode substrate, a liquid crystal layer that is interposed between alignment layers, a common electrode substrate, a color filter substrate, a polarizer, and so forth, which are laminated in this order viewed from the back surface. The image display unit 18 is also provided with a drive circuit for respective pixels and displays an image in accordance with the video signal output from the video processing circuit 13 by controlling the drive circuit in accordance with the video signal.

The backlight control unit 14 generates switch changeover signals on the basis of the VBUS voltage information input from the USB controller 12 by referring to information stored in the memory 15 and outputs the switch changeover signals to the LED backlight system 17. The switch changeover signals are control signals used for turning on (connecting) or turning off (disconnecting) a plurality of switches, which will be described below, provided in the LED backlight system 17.

Figure 8:
FIG. 8 is diagram showing an example of the structure of a table that is stored in a memory 15 shown in FIG. 1.

The memory 15 stores, for example, a table that associates VBUS voltages with the state of each of the switches that represents whether each of the switches is to be turned on or turned off. FIG. 8 shows an example of the structure of the table stored in the memory 15, as a table 30. The table 30 shown in FIG. 8 associates the value of a VBUS voltage (5 V, 9 V, 15 V, or 20 V) with the state of each of switches SW1 to SW24 that represents whether each of the switches is to be turned on or turned off. For example, each of the switch changeover signals described above is a signal that corresponds to one of the VBUS voltages and indicates the state representing whether each of the switches SW1 to SW24 is to be turned on or turned off, as shown in the table 30.

As a light source, the LED backlight system 17 is provided with, for example, a plurality of LEDs that are arranged in a straight line. The LED backlight system 17 receives an input of the VBUS electric power output by the source device 2 via a power source line 19, turns on the plurality of LEDs using the VBUS electric power as a power source and emits a backlight. Moreover, the LED backlight system 17 is provided with optical members, such as a light guide plate and optical sheets, and the LED backlight system 17 irradiates the backlight emitted by the plurality of LEDs to the back surface of the image display unit 18 via the optical members. Furthermore, the LED backlight system 17 is provided with the plurality of switches and turns on or turns off the plurality of switches on the basis of the switch changeover signals input from the backlight control unit 14. Here, an example of the structure of the LED backlight system 17 shown in FIG. 1 will be described with reference to FIG. 2.

Figure 2:
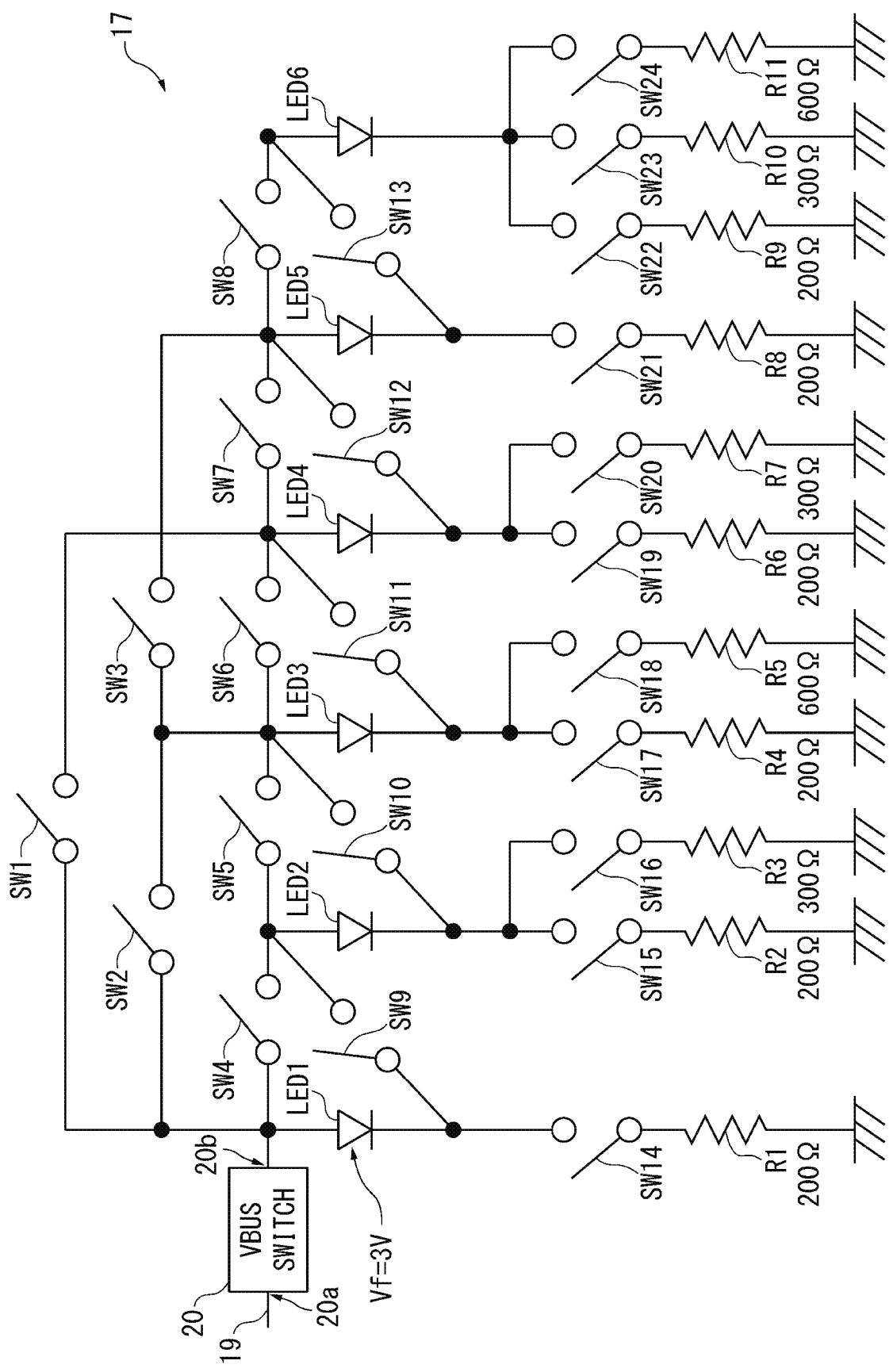
FIG. 2 is a circuit diagram showing an example of the structure of an LED backlight system 17 shown in FIG. 1.

FIG. 2 is a circuit diagram showing an example of the structure of the LED backlight system 17 shown in FIG. 1.

The LED backlight system 17 shown in FIG. 2 is provided with six LEDs (LED1 to LED6) (hereinafter referred to as "LED1 to LED6"), the twenty-four switches SW1 to SW 24, eleven resistors R1 to R11, and a VBUS switch 20.

The VBUS switch 20 is provided with an input terminal 20a and an output terminal 20b, and the input terminal 20a is connected to the power source line 19. The VBUS switch 20 turns on or turns off the connection between the input terminal 20a and the output terminal 20b on the basis of a predetermined control signal output by the backlight control unit 14 shown in FIG. 1.

The output terminal 20b of the VBUS switch 20 is connected to one end of each of the switch SW1, the switch SW2, and the switch SW4 and an anode of the LED1. A cathode of the LED1 is connected to one end of each of the switch SW9 and the switch SW14. The other end of the switch SW14 is connected to one end of the resistor R1. The other end of the resistor R1 is connected to the ground. Both of the other ends of the switch SW4 and the switch SW9 are connected to an anode of the LED2 and one end of the switch SW5.

A cathode of the LED2 is connected to one end of each of the switch SW10, the switch SW15, and the switch SW16. The other end of the switch SW15 is connected to one end of the resistor R2. The other end of the resistor R2 is connected to the ground. The other end of the switch SW16 is connected to one end of the resistor R3. The other end of the resistor R3 is connected to the ground. All of the other ends of the switches SW2, SW5, and SW10 are connected to an anode of the LED3 and one end of each of the switch SW3 and the switch SW6.

A cathode of the LED3 is connected to one end of each of the switch SW11, the switch SW17, and the switch SW18. The other end of the switch SW17 is connected to one end of the resistor R4. The other end of the resistor R4 is connected to the ground. The other end of the switch SW18 is connected to one end of the resistor R5. The other end of the resistor R5 is connected to the ground. All of the other ends of the switches SW1, SW6, and SW11 are connected to an anode of the LED4 and one end of the switch SW7.

A cathode of the LED4 is connected to one end of each of the switch SW12, the switch SW19, and the switch SW20. The other end of the switch SW19 is connected to one end of the resistor R6. The other end of the resistor R6 is connected to the ground. The other end of the switch SW20 is connected to one end of the resistor R7. The other end of the resistor R7 is connected to the ground. All of the other ends of the switches SW3, SW7, and SW12 are connected an anode of the LED5 and one end of the switch SW8.

A cathode of the LED5 is connected to one end of each of the switch SW13 and the switch SW21. The other end of the switch SW21 is connected to one end of the resistor R8. The other end of the resistor R8 is connected to the ground. Both of the other ends of the switch SW8 and the switch SW13 are connected to an anode of the LED6.

A cathode of the LED6 is connected to one end of each of the switch SW22, the switch SW23, and the switch SW24. The other end of the switch SW22 is connected to one end of the resistor R9. The other end of the resistor R9 is connected to the ground. The other end of the switch SW23 is connected to one end of the resistor R10. The other end of the resistor R10 is connected to the ground. The other end of the switch SW24 is connected to one end of the resistor R11. The other end of the resistor R11 is connected to the ground.

The VBUS switch 20 and the switches SW1 to SW24 can be configured using, for example, field effect transistors (FETs) or bipolar transistors. The switches SW1 to SW24 are individually controlled on the basis of the switch changeover signals output by the backlight control unit 14 and are turned on or turned off. The VBUS switch 20 is controlled on the basis of the predetermined control signal output by the backlight control unit 14 and is turned on or turned off. In the LED backlight system 17, current flows through each of the LED1 to LED6 to thereby turn on the backlight. In general, the forward voltages of LEDs for an LED backlight are approximately 3 V. The present example embodiment assumes that the forward voltage Vf of each of the LED1 to LED6 is 3 V.

Moreover, the resistance value of each of the resistors R1, R2, R4, R6, R8, and R9 is 200Ω. The resistance value of each of the resistors R3, R7, and R10 is 300Ω. The resistance value of each of the resistors R5 and R11 is 600Ω.

It is to be noted that the switches SW1 to SW13 are switches that change over the connection of the LED1 to LED6 to a serial connection or a parallel connection. Moreover, the switches SW14 to SW24 are switches that control current flowing through the LED1 to LED6 in cooperation with the resistors R1 to R11. Furthermore, the VBUS switch 20 is a switch that starts energizing the LED1 to LED6 after the route of current flowing through the LED1 to LED6 is determined by turning on or turning off the switches SW1 to SW24.

Figure 3:
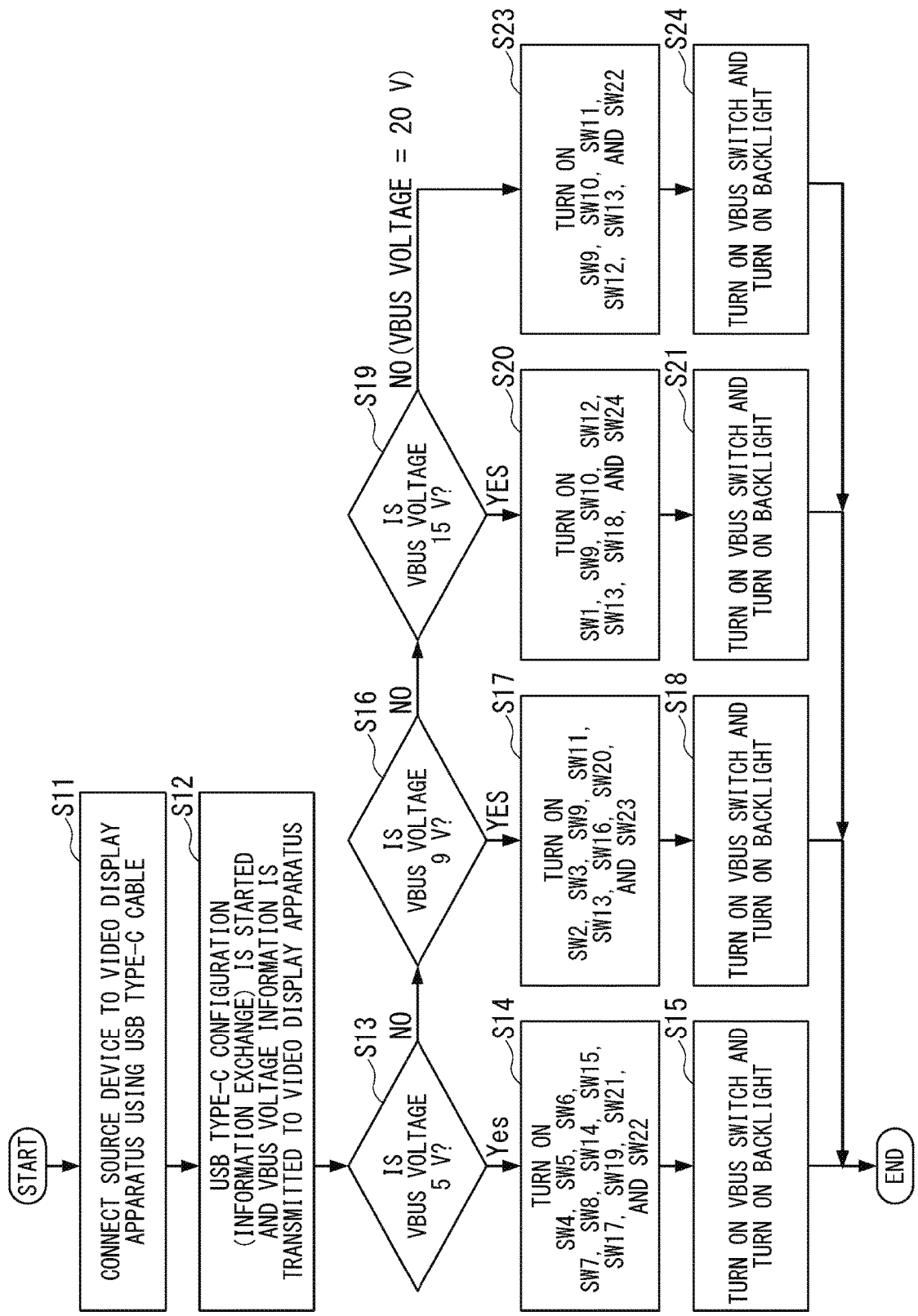
FIG. 3 is a flowchart showing an example of the operation of a liquid crystal display apparatus 1 shown in FIG. 1.

Next, an example of the operation of the video display apparatus 1 shown in FIG. 1 will be described with reference to FIG. 3 to FIG. 7. This example assumes that the LED backlight system 17 shown in FIG. 1 has the structure described with reference to FIG. 2. FIG. 3 is a flowchart showing an example of the operation of the video display apparatus 1 shown in FIG. 1. FIG. 4, FIG. 5, FIG. 6 and FIG. 7 show the set state indicating that each of the switches SW1 to SW24 of the LED backlight system 17 shown in FIG. 2 is turned on or turned off when the VBUS voltage is 5 V, 9 V, 15 V, and 20 V, respectively.

Once the source device 2 shown in FIG. 1 is connected to the video display apparatus 1 shown in FIG. 1 via the USB connector 11 and the USB cable 3 (step S11 in FIG. 3), a configuration is started among the devices and the VBUS voltage information output by the source device 2 is transmitted to the USB controller 12 in the video display apparatus 1 (step S12). As described above, in the case of the USB Type-C power delivery standard, the VBUS voltage is 5 V, 9 V, 15 V, or 20 V. It is to be noted that all the switches are turned off in an initial state.

Figure 4:
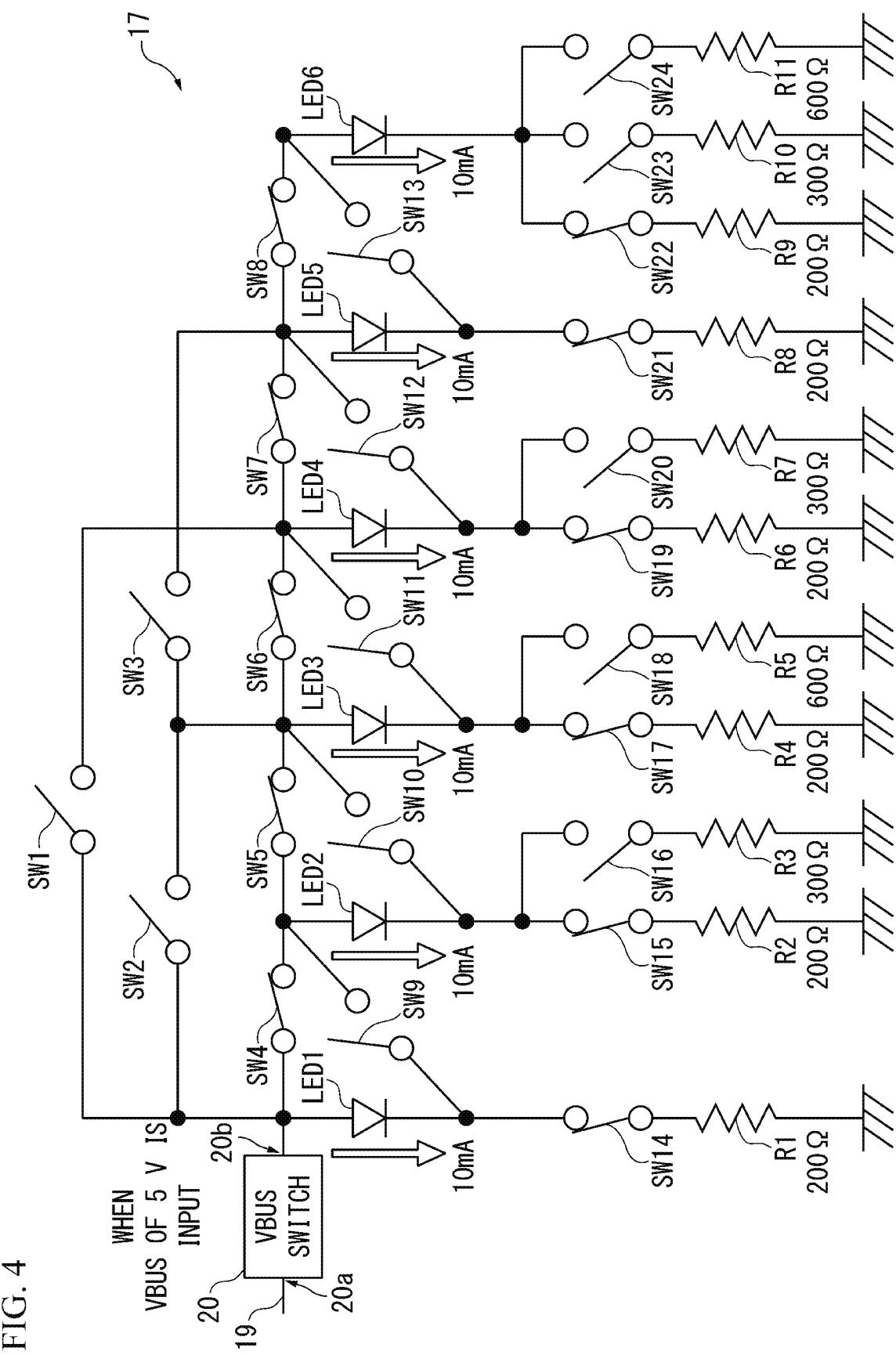
FIG. 4 is a circuit diagram describing an example of the operation of the LED backlight system 17 shown in FIG. 2.

When the VBUS voltage is 5 V (in the case of "Yes" at step S13), the backlight control unit 14 reads switch changeover signals corresponding to a VBUS voltage of 5 V from the table 30 stored in the memory 15. The backlight control unit 14 then transmits the read switch changeover signals to the LED backlight system 17 to turn on the switches SW4, SW5, SW6, SW7, SW8, SW14, SW15, SW17, SW19, SW21, and SW22 as shown in FIG. 4 (step S14). Subsequently, the backlight control unit 14 turns on the VBUS switch 20 to cause current to flow through the LED1 to LED6, thereby turning on the backlight (step S15). When the forward voltages of the LED1 to LED6 are 3 V and the resistors have, for example, the constants shown in FIG. 4, it is possible to cause current of 10 mA to flow through an array of the LED1 to LED6.

Figure 5:
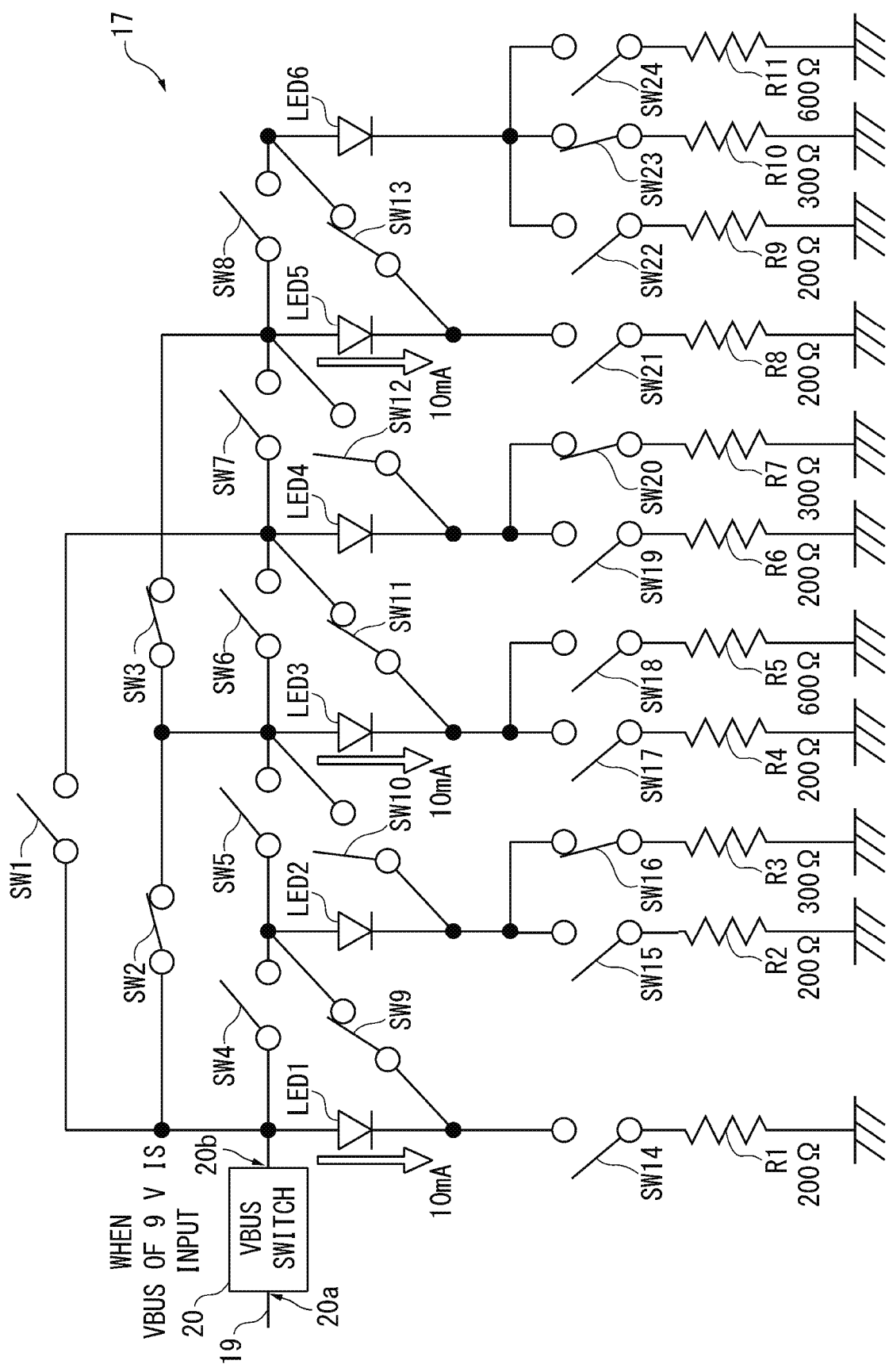
FIG. 5 is a circuit diagram describing an example of the operation of the LED backlight system 17 shown in FIG. 2.

Next, an operation when the input VBUS voltage is 9 V will be described using FIG. 3 and FIG. 5. When the VBUS voltage is 9 V (in the case of "No" at step S13 and "Yes" at step S16), the backlight control unit 14 reads switch changeover signals corresponding to a VBUS voltage of 9 V from the table 30 stored in the memory 15. The backlight control unit 14 then transmits the read switch changeover signals to the LED backlight system 17 to turn on the switches SW2, SW3, SW9, SW11, SW13, SW16, SW20, and SW23 as shown in FIG. 5 (step S17). Subsequently, the backlight control unit 14 turns on the VBUS switch 20 to cause current to flow through the LED1 to LED6, thereby turning on the backlight (step S18). When the resistors have, for example, the constants shown in FIG. 5, it is possible to cause current of 10 mA to flow through each of three arrays in which two LEDs are connected in series. The current flowing through the LED1 to LED6 and the positions where the LEDs are turned on are the same as those when a VBUS voltage of 5 V is input as described above, and thus it is possible to maintain the luminance of the backlight constant even when a different VBUS voltage is input.

Figure 6:
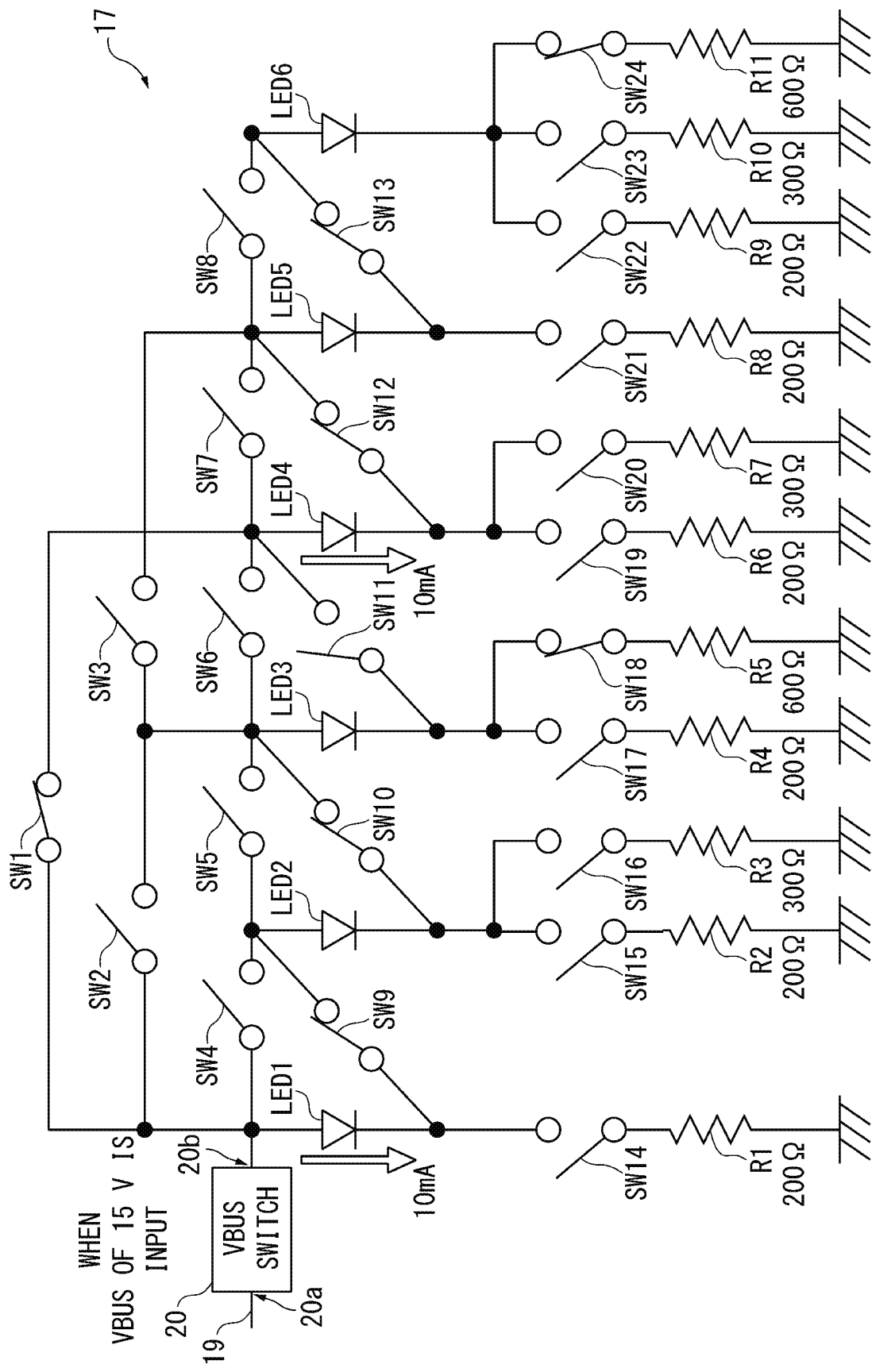
FIG. 6 is a circuit diagram describing an example of the operation of the LED backlight system 17 shown in FIG. 2.

Next, an operation when the input VBUS voltage is 15 V will be described using FIG. 3 and FIG. 6. When the VBUS voltage is 15 V (in the case of "No" at step S13, "No" at step S16, and "Yes" at step S19), the backlight control unit 14 reads switch changeover signals corresponding to a VBUS voltage of 15 V from the table 30 stored in the memory 15. The backlight control unit 14 then transmits the read switch changeover signals to the LED backlight system 17 to turn on the switches SW1, SW9, SW10, SW12, SW13, SW18, and SW24 as shown in FIG. 6 (step S20). Subsequently, the backlight control unit 14 turns on the VBUS switch 20 to cause current to flow through the LED1 to LED6, thereby turning on the backlight (step S21). When the resistors have, for example, the constants shown in FIG. 6, it is possible to cause current of 10 mA to flow through each of two arrays in which three LEDs are connected in series. The current flowing through the LED1 to LED6 and the positions where the LEDs are turned on are the same as those when a VBUS voltage of 5 V is input as described above, and thus it is possible to maintain the luminance of the backlight constant even when a different VBUS voltage is input.

Figure 7:
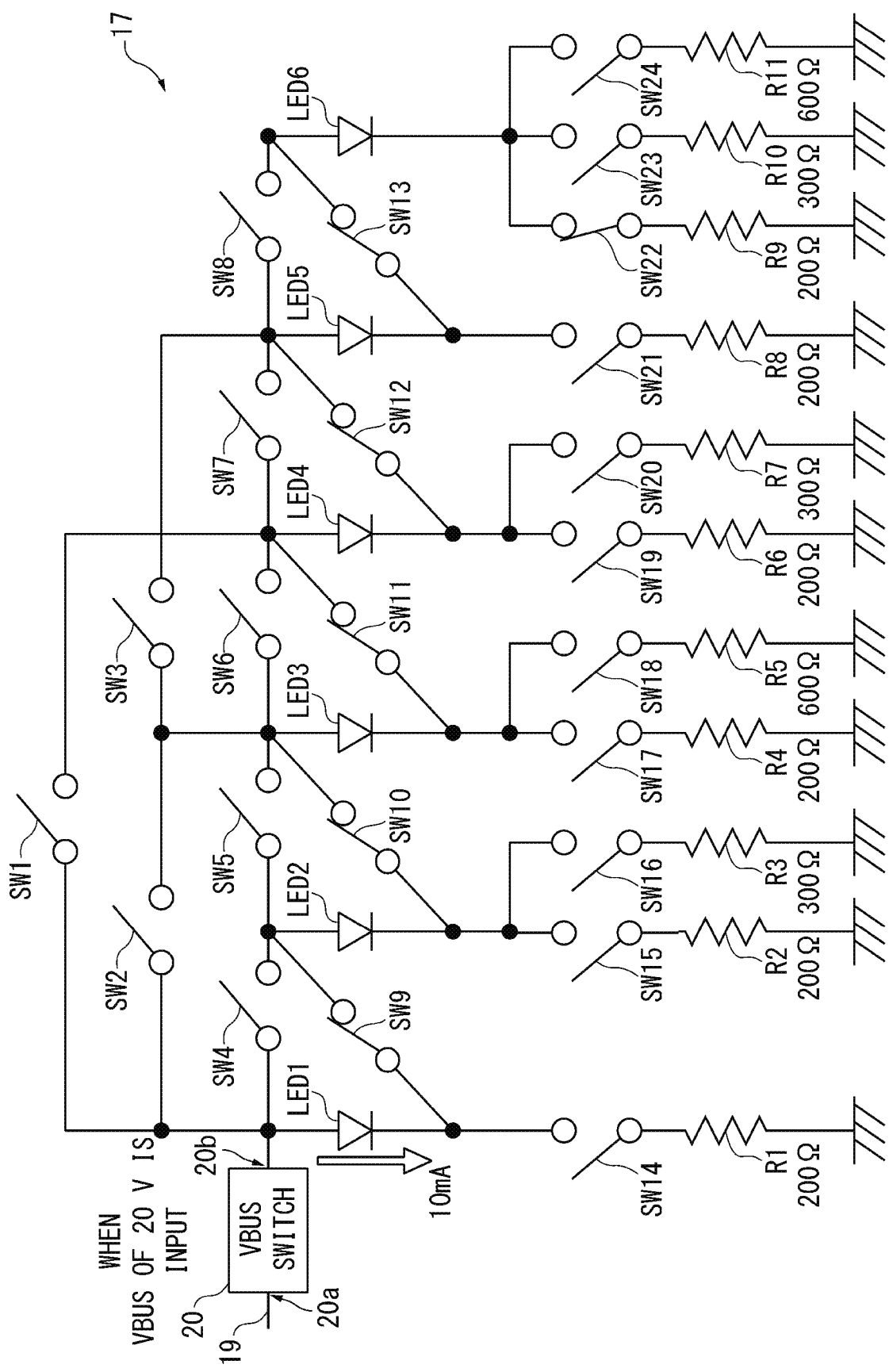
FIG. 7 is a circuit diagram describing an example of the operation of the LED backlight system 17 shown in FIG. 2.

Next, an operation when the input VBUS voltage is 20 V will be described using FIG. 3 and FIG. 7. When the VBUS voltage is 20 V (in the case of "No" at step S13, "No" at step S16, and "No" at step S19), the backlight control unit 14 reads switch changeover signals corresponding to a VBUS voltage of 20 V from the table 30 stored in the memory 15. The backlight control unit 14 then transmits the read switch changeover signals to the LED backlight system 17 to turn on the switches SW9, SW10, SW11, SW12, SW13, and SW22 as shown in FIG. 7 (step S23). Subsequently, the backlight control unit 14 turns on the VBUS switch 20 to cause current to flow through the LED1 to LED6, thereby turning on the backlight (step S24). When the resistors have, for example, the constants shown in FIG. 7, it is possible to cause current of 10 mA to flow through one array in which the six LED1 to LED6 are connected in series. The current of the LED1 to LED6 and the positions where the LEDs are turned on are the same as those when a VBUS voltage of 5 V is input as described above, and thus it is possible to maintain the luminance of the backlight constant even when a different VBUS voltage is input.

As described above, with the present example embodiment, even when the input VBUS voltage (bus-supplied voltage) is changed, it is possible to apply appropriate voltages to the plurality of light emitting diodes, which operate as a light source of the backlight without using a boost circuit in the video display apparatus 1, which displays a screen using the VBUS electric power (bus-supplied electric power) supplied from the source device 2 via the USB cable 3. Moreover, with the present example embodiment, even when the input VBUS voltage (bus-supplied voltage) is changed, it is possible to display video at a constant luminance without using a boost circuit by appropriately setting the correspondence relationship among the VBUS voltage, the number of LEDs connected in parallel or the number of LEDs connected in series, and the resistance values for setting current.

It is to be noted that the above-described example embodiment can be modified as follows. For example, in the video display apparatus 1 shown in FIG. 1, the VBUS voltage information is acquired from the source device 2 and the switch changeover signals to be transmitted to the LED backlight system 17 are determined; however, a voltage detection circuit may be installed on the power source line 19 connected to the VBUS line and the switch changeover signals may be determined using the detected voltage.

Moreover, the VBUS voltage, the forward voltages of the LED1 to LED6, the number of the LEDs (N), and the constants of the resistors used for setting the LED current are not particularly limited to those shown in FIG. 2 and FIG. 4 to FIG. 7. For example, it is sufficient that the number of LEDs (N) that can be connected in series using the LED changeover switches SW9 to SW13 satisfy a formula "Vf× N<VBUS". Moreover, the constant of a resistor used for setting the LED current (R) is determined by an equation "R=(VBUS−Vf×N)/I". Here, Vf denotes the forward voltage of an LED, VBUS denotes the VBUS voltage, N denotes the number of LEDs, R denotes the constant of a resistor used for setting the LED current, and I denotes the LED current for maintaining the backlight at appropriate brightness.

Moreover, a structure in which LEDs are connected in series and a structure in which LEDs are connected in parallel are not particularly limited to the structures shown in FIG. 2 and FIG. 4 to FIG. 7. A structure in which LEDs are connected in series and a structure in which LEDs are connected in parallel can be switched therebetween in accordance with the type of the input VBUS voltage and the forward voltages of the LEDs. In this case, if the LED current is changed as result of a change in the VBUS voltage, the luminance of the panel is changed and thus the visibility is deteriorated. Thus, it is desirable to determine whether the structure in which LEDs are connected in series is used or the structure in which LEDs are connected in parallel is used and determine the constants of the resistors used for setting the LED current so that a change in the luminance falls within, for example, 10%.

Moreover, the loads for setting current are not limited to the resistors R1 to R11 and they may be, for example, constant current diodes. In this case, it is possible to maintain current flowing through the LEDs constant owing to the rated current of the constant current diodes.

Furthermore, the loads for setting current may be provided at, for example, positions including a position between the output terminal 20b of the VBUS switch 20 and the switch SW1, a position between the output terminal 20b and the switch SW2, a position between the output terminal 20b and the switch SW4, and a position between the output terminal 20b and the anode of the LED1, instead of arranging the loads for setting current through the switches. The loads for setting current can be resistors, constant current diodes, or constant current circuits. In this case, when resistors are used as the loads for setting current, current flowing through each LED is changed if the value of the VBUS voltage is changed. Thus, it is desirable to, for example, combine the above-described process with a process in which the video processing circuit 13 adjusts the luminance of video in accordance with a change in the voltage value.

Figure 9:
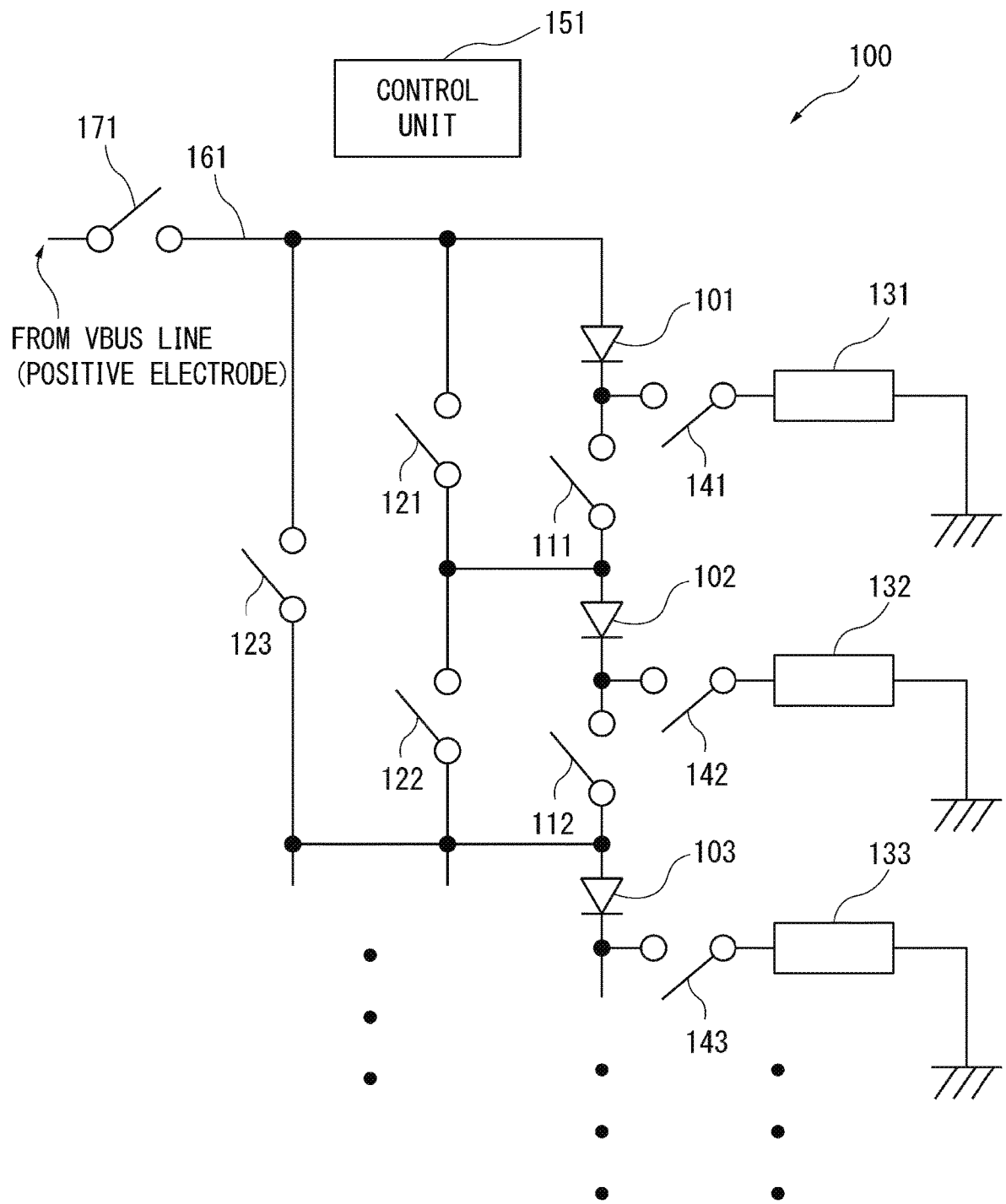
FIG. 9 is a block diagram showing an example of a basic structure of the video display apparatus in accordance with the example embodiment of the present invention.

Next, an example of a basic structure of the example embodiment of the present invention will be described with reference to FIG. 9. FIG. 9 is a circuit diagram showing an example of a basic structure of a backlight system 100 in accordance with the example embodiment of the present invention. The backlight system 100 shown in FIG. 9 is provided with at least a plurality of light emitting diodes 101 to 103, a plurality of serial connection switches 111 and 112, a plurality of parallel connection switches 121 to 123, and a control unit 151.

The plurality of light emitting diodes 101 to 103 use bus-supplied electric power (supplied from a power source line 161) in which the voltage supplied from the VBUS line is changed to one of a plurality of predetermined values, as a power source and operate as a light source of the backlight. The plurality of serial connection switches 111 and 112 connect the plurality of light emitting diodes 101 to 103 in series and disconnect the connections among the plurality of light emitting diodes 101 to 103. The plurality of parallel connection switches 121 to 123 connect the plurality of light emitting diodes 101 to 103 in parallel relative to the power source line 161 (a power source) and disconnect the connections among the plurality of light emitting diodes 101 to 103. Moreover, the control unit 151 turns on or turns off the plurality of serial connection switches 111 and 112 and the plurality of parallel connection switches 121 to 123 in accordance with the voltage value corresponding to the bus-supplied electric power.

With the above-described minimum structure of the example embodiment of the present invention, it is possible to switch the connection relationship among the light emitting diodes 101 to 103 to a serial connection or a parallel connection in accordance with the voltage value corresponding to the bus-supplied electric power, and thus it is possible to apply appropriate voltages to the plurality of light emitting diodes 101 to 103, which operate as a light source of the backlight, without using a boost circuit.

It is to be noted that the backlight system 100 shown in FIG. 9 may be further provided with a plurality of loads for setting current 131 to 133, which are inserted at predetermined positions among a positive electrode of the power source (the power source line 161), one or a plurality of light emitting diodes 101 to 103, and an earth electrode (the ground) of the power source. With this structure, it is possible to set current flowing through the plurality of light emitting diodes 101 to 103 to a predetermined value. It is to be noted that the positions where the loads for setting current 131 to 133 are inserted are not limited to the example shown in FIG. 9, and they may be, for example, positions including a position between an anode of the light emitting diode 101 and the power source line 161, a position between the parallel connection switch 121 and the power source line 161, and a position between the parallel connection switch 123 and the power source line 161. Specifically, with this structure, even if the VBUS voltage input from the USB of the source device is changed in, for example, a monitor that displays a screen using electric power supplied from the USB, it is possible display video at a constant luminance without using a boost circuit.

Moreover, resistors may be used as the loads for setting current 131 to 133, and a plurality of load switches 141 to 143 may be further provided that connect and disconnect the circuits provided among the positive electrode of the power source (the power source line 161), one or a plurality of light emitting diodes 101 to 103, the loads for setting current 131 to 133, and the earth electrode (the ground). With this structure, it is possible to set the current values using the resistors, which are passive elements, and thus it is easily achieve a reduction in the costs.

Furthermore, a bus switch 171 that turns on or turns off supply of the bus-supplied electric power may be further provided, and the control unit 151 may turn on the bus switch 171 after turning on or turning off the plurality of serial connection switches 111 and 112 and the plurality of parallel connection switches 121 to 123. With this structure, it is possible to stabilize the operation.

It is to be noted that the correspondence relationship between the structure shown in FIG. 9 and the structure of the video display apparatus 1 described with reference to FIG. 1, FIG. 2, and so forth is as follows. Specifically, the backlight system 100 shown in FIG. 9 corresponds to a structure in which the LED backlight system 17 shown in FIG. 1 and FIG. 2 is combined with the backlight control unit 14 shown in FIG. 1. The light emitting diodes 101 to 103 shown in FIG. 9 correspond to the LED1 to LED6 shown in FIG. 2. The serial connection switches 111 and 112 shown in FIG. 9 correspond to the switches SW9 to SW13 shown in FIG. 2. The parallel connection switches 121 to 123 shown in FIG. 9 correspond to the switches SW1 to SW8 shown in FIG. 2. The control unit 151 shown in FIG. 9 corresponds to the backlight control unit 14 shown in FIG. 1. The power source line 161 shown in FIG. 9 corresponds to electric wiring connected to the output terminal 20b of the VBUS switch 20 shown in FIG. 1 and FIG. 2. The loads for setting current 131 to 133 shown in FIG. 9 correspond to the resistors R1 to R11 shown in FIG. 2. The load switches 141 to 143 shown in FIG. 9 correspond to the switches SW14 to SW24 shown in FIG. 2. Moreover, the bus switch 171 shown in FIG. 9 corresponds to the VBUS switch 20 shown in FIG. 2.

It is to be noted that the present invention is not limited to the above-described example embodiment, and the present invention encompasses modifications, improvements, and so forth to the extent that the example object of the present invention can be achieved.

Moreover, the example aspects of the present invention may include the following. Specifically, the backlight system, which is an example aspect of the present invention, may include means for recognizing or detecting a VBUS voltage output from a USB of a source device, means for storing tables that correspond to VBUS voltages and are used for automatically changing over a plurality of switches, and a structure that changes over LED arrays for a backlight to a serial connection or a parallel connection using the switches.

DESCRIPTION OF REFERENCE SIGNS

1 . . . video display apparatus (display apparatus)
14 . . . backlight control unit
17 . . . LED backlight system
19, 161 . . . power source line
20 . . . VBUS switch
100 . . . backlight system
101 to 103 . . . light emitting diode
111, 112 . . . serial connection switch
121 to 123 . . . parallel connection switch
131 to 133 . . . load for setting current
141 to 143 . . . load switch
151 . . . control unit
171 . . . bus switch
LED1 to LED6 . . . LED
R1 to R11 . . . resistor
SW1 to SW8 . . . switch (parallel connection switch)

SW9 to SW13 . . . switch (serial connection switch)
SW14 to SW24 . . . switch (load switch)

The invention claimed is:

1. A backlight system comprising:
a plurality of light emitting elements that operate as a light source of a backlight using bus-supplied electric power in which a voltage is changed to one of a plurality of predetermined values as a power source;
a plurality of serial connection switches that connect the plurality of light emitting elements in series and disconnect connections among the plurality of light emitting elements;
a plurality of parallel connection switches that connect the plurality of light emitting elements in parallel relative to the power source and disconnect the connections among the plurality of light emitting elements;
a bus switch that turns on or turns off supply of the bus-supplied electric power; and
a controller that turns on the bus switch after turning on or turning off the plurality of serial connection switches and the plurality of parallel connection switches in accordance with the value of the voltage corresponding to the bus-supplied electric power.

2. The backlight system according to claim 1, further comprising a plurality of loads for setting current that are inserted at predetermined positions among a positive electrode of the power source, one or a plurality of the light emitting elements, and an earth electrode of the power source.

3. The backlight system according to claim 2, wherein the loads for setting current comprise resistors, and
the backlight system further comprises a plurality of load switches that connect and disconnect circuits provided among the positive electrode, one or a plurality of the light emitting elements, the loads for setting current, and the earth electrode.

4. A display apparatus comprising:
a backlight system that comprises
a plurality of light emitting elements that operate as a light source of a backlight using bus-supplied electric power in which a voltage is changed to one of a plurality of predetermined values as a power source,
a plurality of serial connection switches that connect the plurality of light emitting elements in series and disconnect connections among the plurality of light emitting elements,
a plurality of parallel connection switches that connect the plurality of light emitting elements in parallel relative to the power source and disconnect the connections among the plurality of light emitting elements,
a bus switch that turns on or turns off supply of the bus-supplied electric power; and
a controller that turns on the bus switch after turning on or turning off the plurality of serial connection switches and the plurality of parallel connection switches in accordance with the value of the voltage corresponding to the bus-supplied electric power; and
an image display that displays an image by transmitting the backlight.

5. A control method for a backlight system, the control method comprising:
using a plurality of light emitting elements that operate as a light source of a backlight using bus-supplied electric power in which a voltage is changed to one of a plurality of predetermined values as a power source, a plurality of serial connection switches that connect the plurality of light emitting elements in series and disconnect connections among the plurality of light emitting elements, a plurality of parallel connection switches that connect the plurality of light emitting elements in parallel relative to the power source and disconnect the connections among the plurality of light emitting elements, and a bus switch that turns on or turns off supply of the bus-supplied electric power,
turning on, by a controller, the bus switch after turning on or turning off, by the controller, the plurality of serial connection switches and the plurality of parallel connection switches in accordance with the value of the voltage corresponding to the bus-supplied electric power.

* * * * *